United States Patent

[11] 3,587,689

| [72] | Inventor | Louis A. Bettcher<br>Amherst, Ohio |
|---|---|---|
| [21] | Appl. No. | 785,088 |
| [22] | Filed | Dec. 19, 1968 |
| [45] | Patented | June 28, 1971 |
| [73] | Assignee | Bettcher Industries, Inc.<br>Continuation-in-part of application Ser. No. 561,180, June 28, 1966, now Patent No. 3,434,519. |

[54] COMESTIBLE SLICING APPARATUS
25 Claims, 24 Drawing Figs.

[52] U.S. Cl. ................................................. 146/105, 146/124
[51] Int. Cl. ................................................. B26d 1/14
[50] Field of Search .......................................... 146/105, 124, 125, 102.11, 217; 147/132.2

[56] References Cited
UNITED STATES PATENTS

| 2,822,011 | 2/1958 | Lundell | 146/102 |
| 3,181,582 | 5/1965 | Bailey | 146/105 |
| 3,194,289 | 7/1965 | Lundell | 146/105 |

*Primary Examiner*—Willie G. Abercrombie
*Attorney*—Watts, Hoffmann, Fisher & Heinke

ABSTRACT: Cutting apparatus with upright receptacles that carry comestible workbodies in a circular path past a rotating knife that severs slices. The receptacles include biasing plates for the workbodies that are slidable on inclined guides to urge the workbodies downward. A table adjustment, a backup plate for slices being severed, a deflector plate for severed slices, a rod for lifting the biasing plates, a transverse severing blade, a blade sharpener, and various receptacle configurations are provided.

INVENTOR.
LOUIS A. BETTCHER
BY Watts, Hoffmann, Fisher & Heinke
ATTORNEYS.

INVENTOR.
LOUIS A. BETTCHER
BY Watts, Hoffmann,
Fisher & Heinke
ATTORNEYS.

INVENTOR.
LOUIS A. BETTCHER
BY Watts, Hoffmann,
Fisher & Heinke
ATTORNEYS.

INVENTOR.
LOUIS A. BETTCHER
BY Watts, Hoffmann,
Fisher & Heinke
ATTORNEYS.

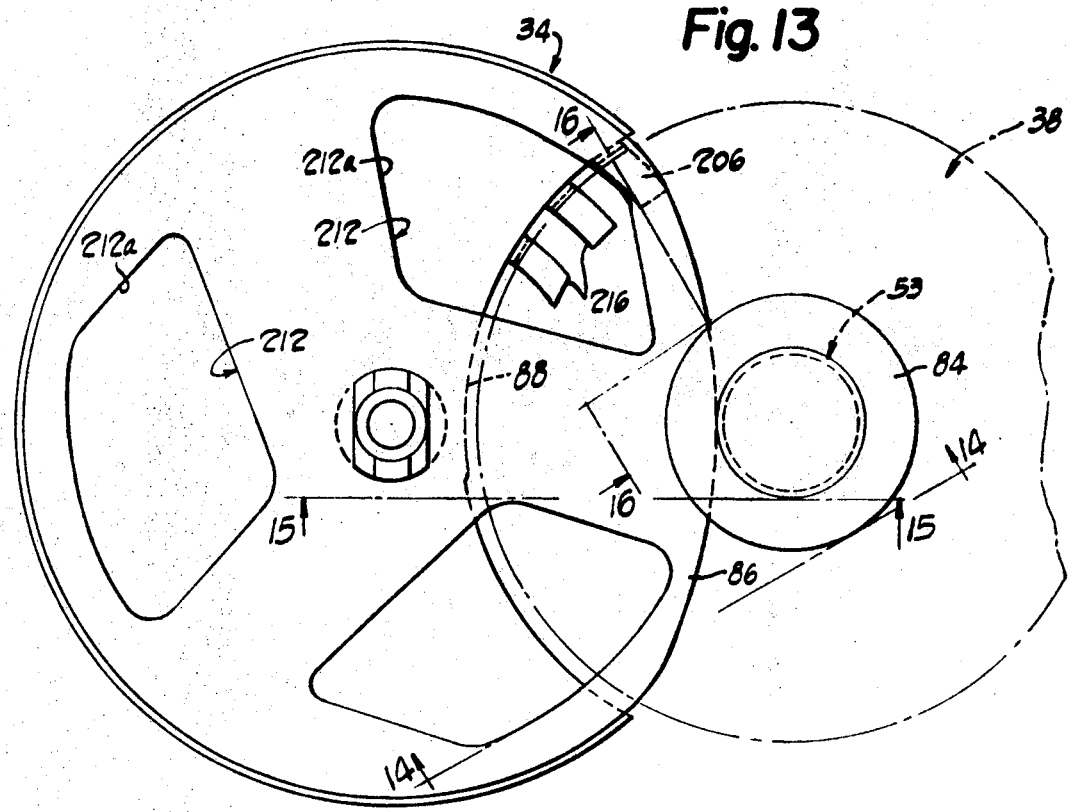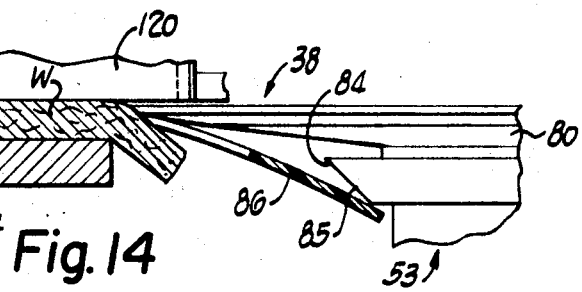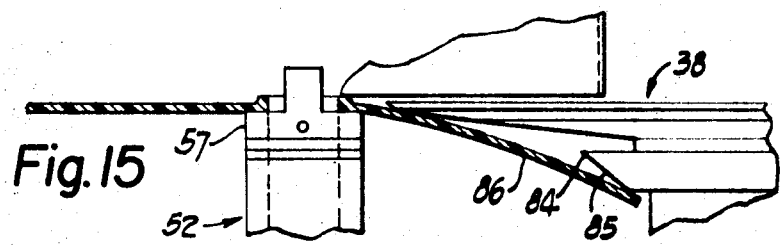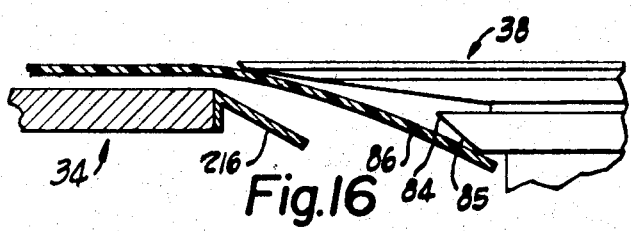

INVENTOR.
LOUIS A. BETTCHER
BY Watts, Hoffmann,
Fisher & Heinke
ATTORNEYS.

3,587,689

COMESTIBLE SLICING APPARATUS

CROSS REFERENCE TO RELATED APPLICATION

This application is a continuation-in-part of copending application, Ser. No. 561,180 filed June 28, 1966, and entitled "Power Cleaver."

BACKGROUND AND SUMMARY OF INVENTION

This invention relates to cutting apparatus, and in particular to cutting apparatus for severing slices or sections from a comestible workbody, especially meat bodies including frozen products and those having bones therein.

Cutting apparatus of the general type to which this application relates is described in the aforementioned copending application. The apparatus disclosed therein moves a workbody carried by a receptacle in an endless path past a cutter, which severs sections from the workbody. The receptacle has an inclined interior surface that directs the workbody downward into cutting position in response to centrifugal force and rearward to minimize any tendency of the workbody to move upward during the severing operation. The simplicity and effectiveness of that arrangement provide important advantages over known cutting apparatus.

The present invention provides new and improved cutting apparatus for severing slices from a comestible workbody, and includes an improved rotary magazine with novel workbody receptacles and associated structure.

An object of the present invention is to provide a new and improved upright elongated workbody receptacle, for use in cutting apparatus of the type described above, for carrying a workbody in an endless path transversely of its longitudinal axis past a knife means and having a longitudinal workbody passageway, an open discharge end, an axially elongated opening along the workbody passageway, a guide extending longitudinally of the receptacle, and a biasing member movable along the guide and located at least partially within the workbody passageway to bias a workbody toward the discharge end of the receptacle.

Another object of the present invention is to provide an improved receptacle for use in cutting apparatus of the type described above for carrying a workbody in an endless path past a knife means, which is provided with a vertical interior wall perpendicular to the plane of said endless path and having a guide for carrying a workbody biasing member and inclined relative to the interior wall so that the guide urges the biasing member downward due to the inertia of the member and/or the centrifugal force acting thereon when the receptacle is moved in said endless path.

Another object of the present invention is to provide a new and improved receptacle of the type referred to in the preceding object in which the guide is inclined, relative to an axis about which the receptacle is adapted to be moved, in a direction or directions that urge the biasing member downward due to the inertia of the member and/or the centrifugal force acting thereon.

Another object of the present invention is the provision of a new and improved cutting apparatus with a rapid and positive thickness control to adjust between predetermined limits the thickness of slices made from the workbody.

A further object of the present invention is to provide a new and improved cutting apparatus in which a portion of the workbody is backed up by a member rigid in the direction of cutting and located below the knife means to inhibit portions being severed from bending away from the workbody and tearing free prior to completion of the cutting operation. Preferably, the member is flat and thin and carried along with the receptacle, positioned to abut the trailing edge of a portion of the workbody extending from the receptacle. As the member passes beneath the knife means after a slice is severed from the workbody, it can be flexed transversely of its plane of movement to clear the support for the knife means.

A still further object of the present invention is to provide a new and improved cutting apparatus with a plurality of receptacles on a carrier assembly and a lifting member vertically movable relative to the carrier assembly, engageable with biasing members of the receptacles and movable between a lower position out of contact with the biasing members and a raised position to which it lifts the biasing members so that new workbodies can be conveniently positioned in the receptacles. An arrangement is also provided for limiting the upward movement of the lifting member with respect to the carrier assembly so that upward movement lifts the entire assembly to facilitate cleaning.

Another object of the present invention is to provide a new and improved cutting apparatus in which a workbody is rotated past a first knife blade with a flat surface across which the workbody moves and with a beveled opposite surface that directs a severed section away from the workbody, and which includes a second knife with a cutting edge adjacent the beveled surface to slice severed sections in a transverse direction to the severing cut as the section is directed away from the workbody.

Another object of this invention is to provide a new and improved receptacle for use with cutting apparatus of the type described and especially shaped to accommodate a workbody having a bone and which is to be cut into chops or steaks, the receptacle being elongated in a direction transverse to the direction in which it is moved during use and the transverse cross-sectional shape comprising two straight wall segments converging at an acute angle and joined by a curved wall segment with the included angle between the straight wall segments adapted to face in a direction of movement when the receptacle carries a workbody past a severing means.

Other objects of this invention are to provide a novel structure for supporting and carrying the workbody receptacles, a novel receptacle with longitudinally extending ridges to reduce surface contact with the workbody, a biasing roller to urge the workbody against a guiding surface of a receptacle, and a deflector plate to bend severed slices of a workbody sufficiently to break the slices into smaller pieces.

These and other objects, features and advantages of this invention will become more apparent and better understood from the following detailed description of preferred embodiments of the invention, described with reference to the accompanying drawings.

BRIEF DESCRIPTION OF THE DRAWINGS

FIG. 13 is a partial plan view of a rotatable magazine assembly and rotary knife assembly, with parts removed to show a workbody backup disc which can be carried directly beneath the magazine assembly and above the table of the cutting apparatus;

FIG. 14 is a fragmentary vertical view, partially in section, taken along the line 14–14 of FIG. 13 and looking in the direction of the arrows;

FIG. 15 is a fragmentary vertical view partially in section, taken along the line 15–15 of FIG. 13 and looking in the direction of the arrows;

FIG. 16 is a fragmentary vertical view, partially in section, taken along the line 16–16 of FIG. 13 and looking in the direction of the arrows;

Figure 1:
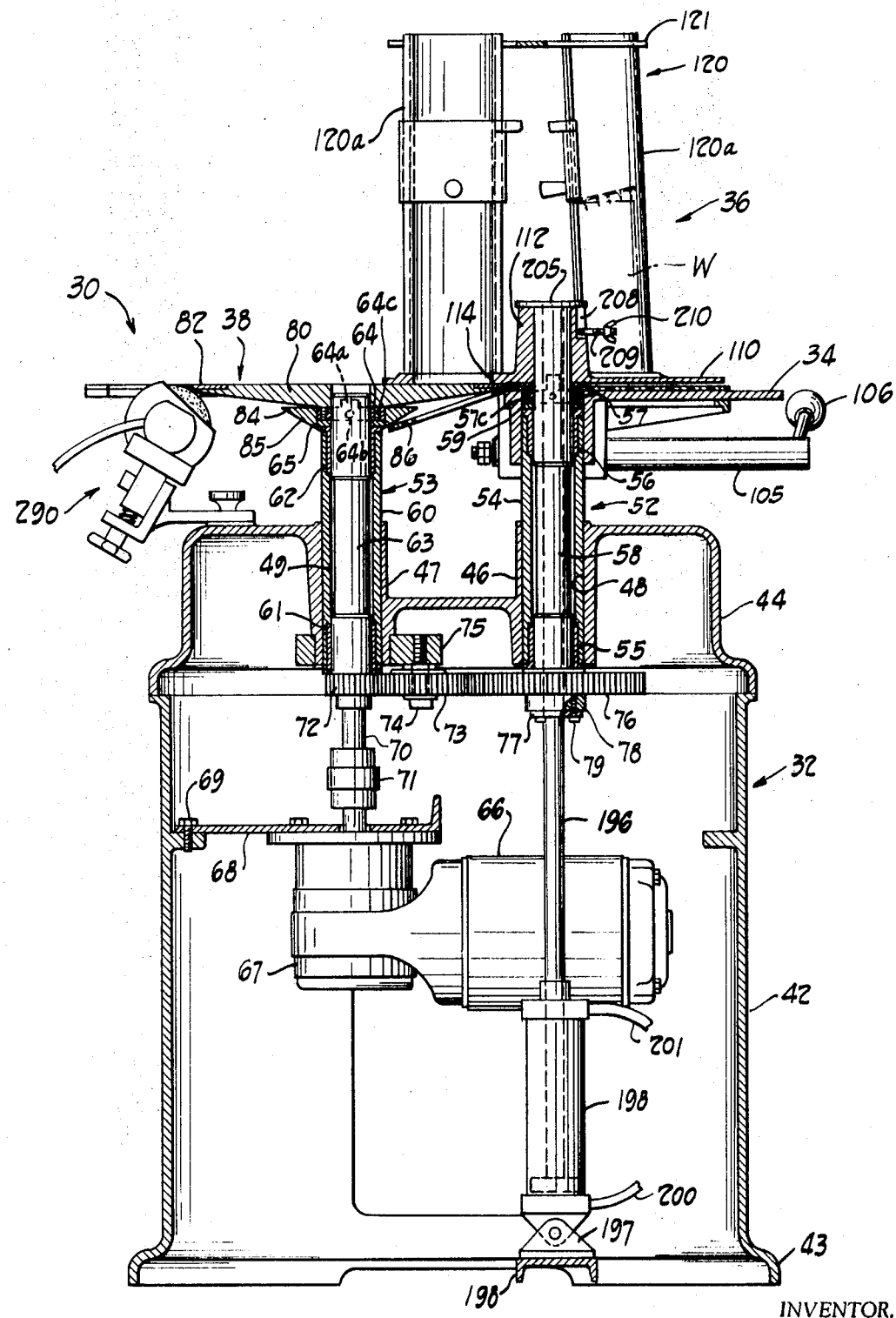
FIG. 1 is a vertical view, partially in section, of a preferred embodiment of the cutting apparatus of the present invention, illustrating the general construction and arrangement of the apparatus and showing a preferred construction of workbody receptacles.

DESCRIPTION OF PREFERRED EMBODIMENTS a. General Arrangement

Referring to the drawings, a cutting apparatus constructed in accordance with this invention is indicated generally by the reference numeral 30. The general arrangement of the cutting apparatus 30, best shown in FIG. 1, includes a stationary support 32, a horizontally disposed table 34 supported by the stationary support 32, a rotatable magazine assembly 36 disposed above the table 34 and rotatably supported by the stationary support 32 for rotating one or more workbodies through an endless path, and a rotary knife assembly 38 supported supported the stationary support 32 and located partially in an opening or recess in the table 34. The rotary knife assembly 38 is in the path of movement of workbodies carried by the rotatable assembly 36 and severs a slice or section from a workbody as it is moved past the rotary knife assembly by the rotatable magazine assembly 36.

b. Stationary Support

The stationary support 32 is formed of a cast housing 42 that is generally cylindrical in shape and has a base 43. A cast cover 44 is secured to the top of the cast housing 42 and forms the upper portion of the stationary support 32. The cover 44 includes two horizontally spaced, vertically extending, boss portions 46, 47 having through passageways 48, 49 respectively. A shaft subassembly 52 is mounted in the passageway 48 and rotatably supports the magazine assembly 36. A shaft subassembly 53 is mounted in the passageway 49 and supports the rotary knife assembly 38 for rotation.

The subassembly 52 comprises a fixed support sleeve 54 received in the passageway 48 and extending upward from the cover 44, two sleeve bearings 55, 56 in counterbores at opposite ends of the support sleeve 54, and a tubular driven shaft 58 journaled in the bearings 55, 56 extending through the support sleeve 54, and projecting above the upper end of the sleeve where it is coupled to the rotatable assembly 36. A collar 57 with a key 57a that rotatably couples the assembly 36 to the shaft 58 is secured to the shaft 58 above the bearing 56 by a screw 57b. A thrust washer 59 is interposed between the collar 57 and the bearing 56. Adjustable setscrews 57c in the collar 57 bear against the washer 59 and properly locate the shaft 58 axially.

The subassembly 53 is similarly constructed, with a support sleeve 60 fixed in the passageway 49 and extending above the cover 44. Sleeve bearings 61, 62 are located in counterbores at opposite ends of the support sleeve 60 and journal a driven shaft 63 that is coupled to the rotary knife assembly 38 by a collar 64 having a key 64a and secured by a screw 64b to the shaft. A thrust washer 65 is interposed between the collar 64 and the bearing 62. Adjustable setscrews 64c in the collar 64 bear against the washer 65 and properly locate the shaft 63 axially.

The shafts 58, 63 connected with the rotatable magazine assembly 36 and rotary knife assembly 38 are driven by an electric motor 66 and transmission unit 67 supported within the housing 42 by a mounting plate 68 secured by screws 69 to the housing 42. A drive shaft 70 from the transmission unit 67 is connected by a coupling 71 to the driven shaft 63, coupled with the rotary knife assembly 38. A spur gear 72 is keyed to the lower end of the driven shaft 63 and drives an idler gear 73, which is rotatably carried by a mounting bolt 74 suspended from a support member 75 on the cover 44. The idler gear 73 in turn drives a gear 76 keyed to the lower end of the driven shaft 58 coupled with the rotatable magazine assembly 36. A retaining ring 77 beneath a hub 78 of the gear 76 is secured by screws 79 to the lower end of the shaft 58 and supports the gear 76. The gear 76 is larger than the gear 72 so that the shaft 58 rotates at a slower speed than the shaft 63 and in the same direction due to the idler gear 72.

c. Rotary Knife Assembly and Table

The knife assembly 38, as best shown in FIG. 1, includes a generally disc-shaped support member 80 on the upper end of the driven shaft 63 rotatably fixed with the shaft by the key 64a of the collar 64. An annular ring-shaped blade 82 is recessed in the top surface of the disc-shaped support member 80. The blade 82 forms the peripheral edge of the knife assembly and is secured to the support member 80 by a plurality of screws, not shown. A deflector 84 can, as shown, be secured near the upper end of the shaft 63 about the collar 64 and directly beneath the disc-shaped support member 80 of the knife assembly. The deflector has a conical surface 85 that converges in a downward direction and serves to deflect a thin flexible disc 86, that may be carried by the rotatable magazine assembly 36 to back up workbody portions being severed, as will be described in more detail subsequently.

Figure 2:
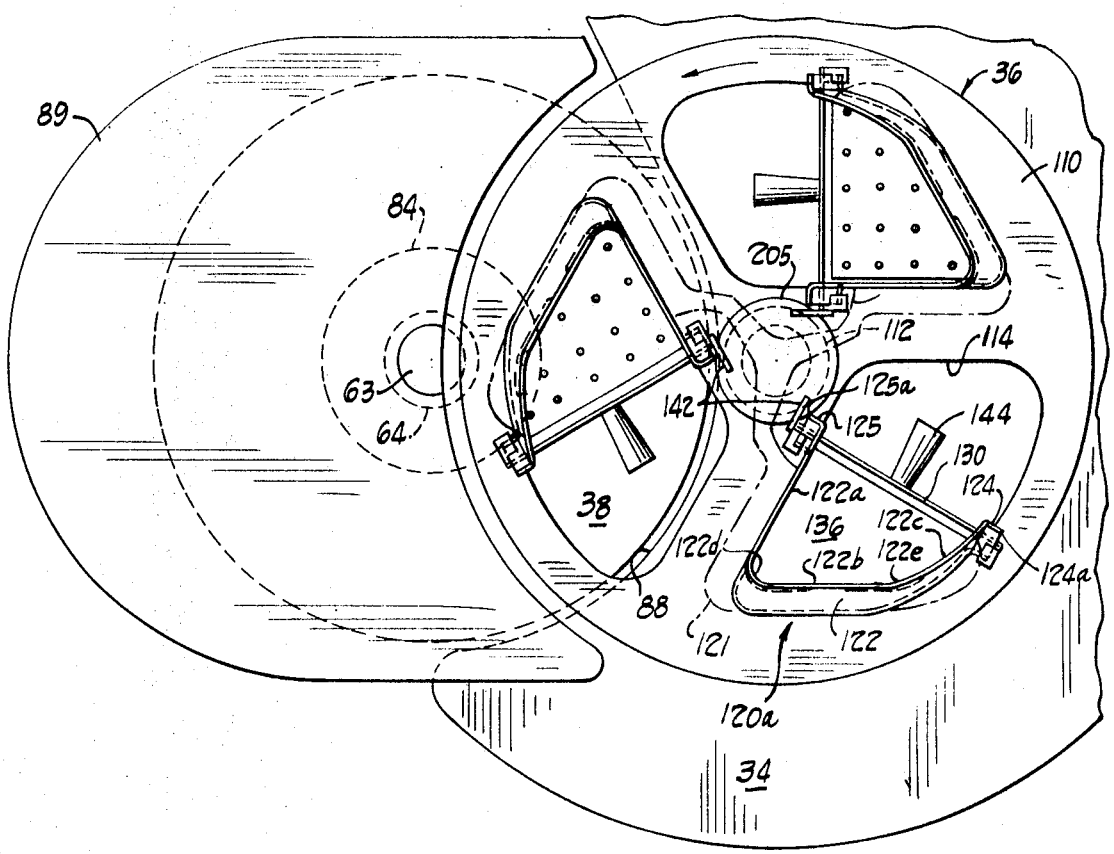
FIG. 2 is a plan view of the cutting apparatus of FIG. 1.

As best shown in FIG. 2, the periphery of the rotary knife assembly 38 is partially inset into an arcuate opening 88 in the horizontal table 34. A guard 89 substantially covers the remaining peripheral portion of the blade that extends from the table. Both the table 34 and a portion of the knife assembly 38 lie in part beneath the rotatable magazine assembly 36. Workbodies carried by the rotatable magazine assembly 36 rest upon and slide across the upper surface of the table 34 until they reach the arcuate opening 88, after which they move across the rotary knife assembly 38. If the table 34 is at a lower level than the cutting edge of the rotary knife assembly 38, a slice or section of the workbody carried by the rotatable magazine assembly 36 will be severed by the knife assembly.

Figure 5:
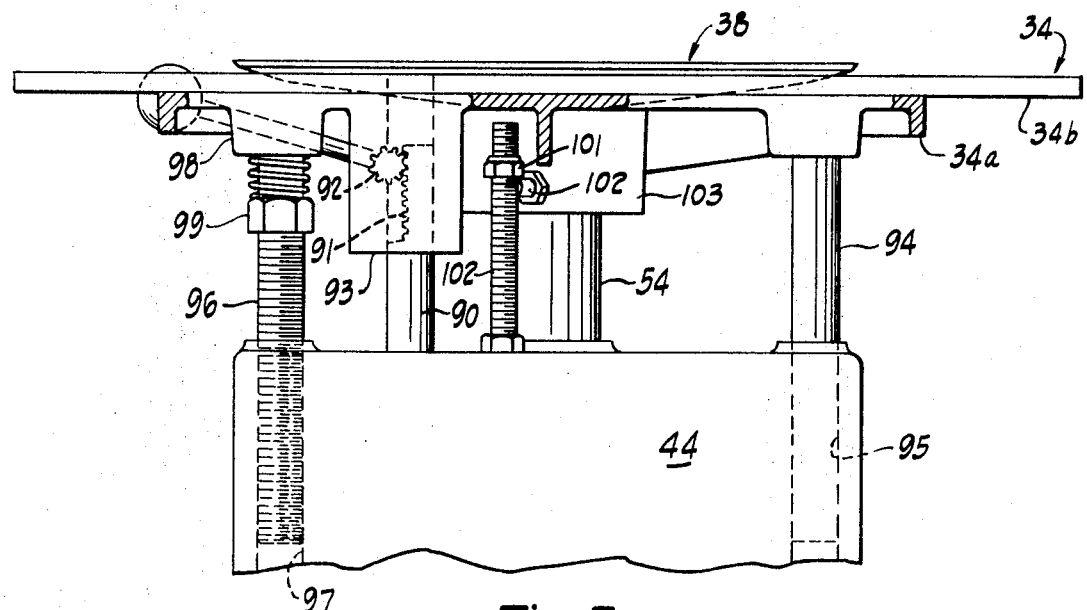
FIG. 5 is a fragmentary elevational view of a table adjustment mechanism constructed in accordance with the present invention, showing the table in a raised position.
Figure 6:
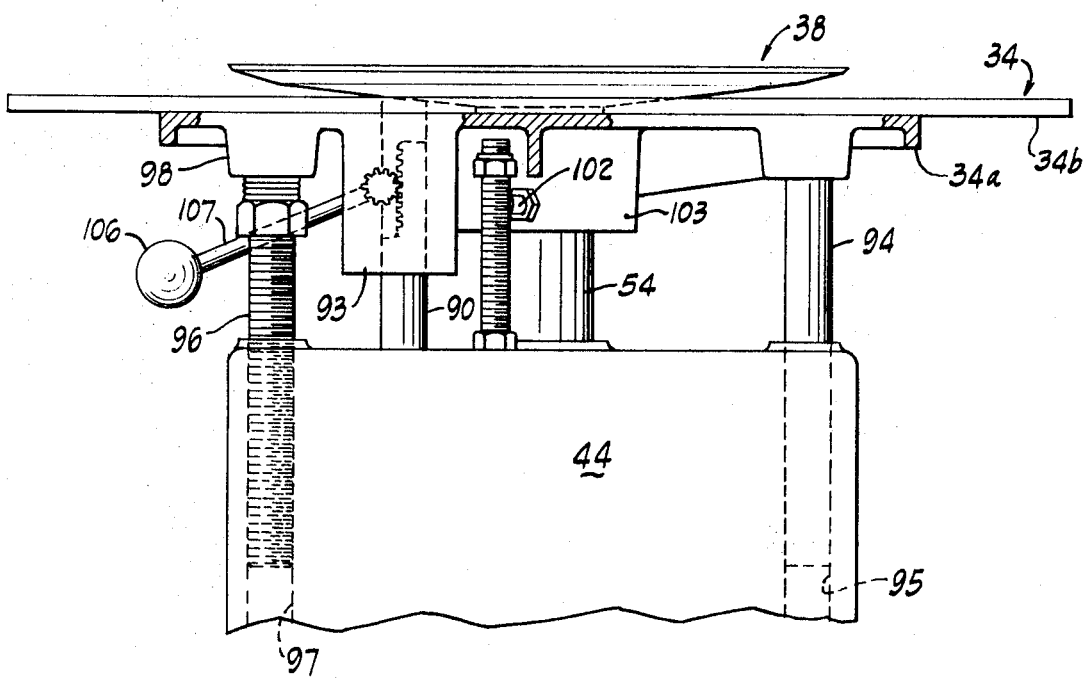
FIG. 6 is a fragmentary elevational view similar to FIG. 5 showing the table in a lower position.

As best shown in FIGS. 5 and 6, the horizontal table 34 is supported for vertical adjustment relative to the cast cover 44 of the support structure and relative to the rotary knife assembly 38 in order to change the thickness of sections to be severed from a workbody. The table 34 includes a cast base 34a and a flat cover member 34b somewhat larger in size that form the support surface for the workbodies carried by the magazine assembly. The table part 34a is supported by a vertical post 90 that is formed with a rack 91 at its upper end. The table is connected to the post by a pinion gear 92 that is carried by the table and which meshes with the rack. The gear 92 is journaled for rotation within a sleeve 93 that depends from the horizontal table base 34a and encircles the rack 91 and the upper end of the post 90. A vertical guide rod 94 also depends from the table base 34a and is slidingly received in a bore 95 in the cast cover 44. A threaded rod 96 extends upward from a threaded bore 97 in the cover 44 and an upper end of the rod 96 is slidably received in a boss 98 depending from the table part 34a. An adjustable stop-nut 99 is carried on the rod 96 and a coil spring 100 encircling the rod 96 is interposed between the stop-nut and the boss. The stop-nut 99 and spring 100 provide an adjustable stop that limits downward movement of the table 34 relative to the knife assembly 38. Upward movement of the table is limited by an adjustable stop-nut 101 carried on a threaded rod 102 extending upward from the cover 44. An abutment pin 102 extends outward from a central boss 103 of the table base, beneath the stop-nut 101. The pin is located to abut the stop-nut 101 when the table 34 is raised.

The pinion 92 is rotated by a coaxial shaft 105 shown in FIG. 1. The shaft 105 extends transversely of the sleeve 93, terminating beyond the table 34. An operating handle 106 is attached to a rod 107 extending from the shaft 105 so that an operator can easily and accurately rotate the pinion 92. As shown in FIGS. 5 and 6, movement of the operating handle 106 from an upper position to a lower position lowers the table 34 relative to the rotary knife assembly 38. The upper and lower limits of the table movement are set by the adjustment nuts 99 and 101 to establish the thickness range of the slices to be severed from a workbody. Thick slices at the maximum setting can be taken at first to square the end of the workbody if necessary, and then the operator can reduce the thickness to selectively control the weight of each slice. This is especially important in meat products where the workbody varies in cross-sectional area.

Throughout the vertical travel of the table 34, the sleeve 93 continuously covers the rack 91 at the upper end of the vertical support post 90. This enclosing of the rack 91 and pinion 92 by the sleeve 93 protects the table adjustment mechanism from dirt or other foreign matter. The pinion 92 is frictionally held in an adjusted position after the operating handle is released.

d. Rotatable Magazine Assembly

1. General

Figure 4:
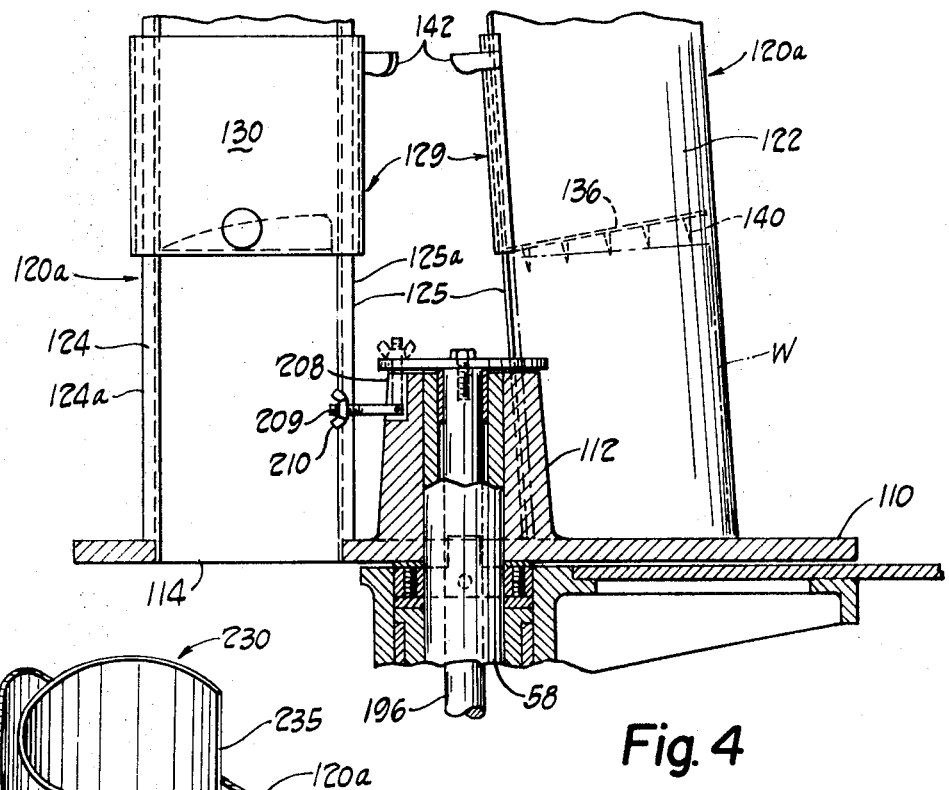
FIG. 4 is a partial elevational view with parts in section of the rotatable magazine assembly of FIG. 1 on an enlarged scale.

As best shown in FIGS. 1, 2 and 4, the rotatable magazine assembly 36 is comprised of a circular base plate 110 having a central supporting hub 112. The base plate and hub are preferably an integral assembly formed of suitable metal, such as cast aluminum. One or more openings 114 are formed through the circular base plate 110 so that a workbody carried by the rotatable assembly can pass downward through the plate 110, rest upon the table 34, and pass across the rotary knife assembly 38. Receptacles or magazines 120 are carried by the circular base plate 110 and extend upward from the openings 114, of which there are three in the preferred embodiment. The receptacles 120 serve to locate and move workbodies in an endless path as the circular base plate 110 is rotated by the driven shaft 58 from the housing 32. The receptacles 120 move the workbodies transversely across the plane of the rotary knife assembly while allowing the workbodies to slide downward after the section is severed so that a subsequent section can be severed upon further rotation of the rotatable magazine assembly 36. A rigid connecting member 121 is secured to the upper ends of the receptacles to maintain them in spaced relationship and in proper alignment. Several different embodiments of receptacles 120 are disclosed herein, and are identified by the suffixes a, b, c, d.

2. Receptacles and Workbody Followers

One embodiment of the receptacles 120 is shown in FIGS. 1, 2 and 4 and is identified by reference character 120a. The receptacles 120a are constructed to slidably receive a workbody W, to support the workbody in an upright position, to accommodate a workbody follower or biasing member, and to utilize the inertia of the workbody follower to exert additional downward force upon the workbody when the receptacle is moved and to reduce the upward component of any forces that act through the workbody, upon the biasing member during the cutting operation.

Referring now to FIGS. 2 and 4, the receptacle 120a is formed of a sheet metal piece 122 shaped to form generally flat vertical wall segments 122a, b, c joined by curved wall segments 122d, e. As shown in the plan view of FIG. 2, the wall segments 122a and 122c are spaced and extend generally in the same direction, the wall segment 122c is shorter than the segment 122a, and is located adjacent the periphery of the circular base plate 110. The included angle between the wall segments 122a, 122b is acute and the included angle between the wall segments 122b, 122c is obtuse. The wall segments 122a, 122c terminate in outwardly extending flanges 124, 125 that lie in a common plane and form a longitudinal opening 123 to the receptacle. The flanges have parallel outer edges 124a, 125a and guide a workbody follower.

Each receptacle 120a is positioned at the trailing edge (relative to the direction of movement) of one of the openings 114 in the circular base plate 110. As shown in FIG. 2, the openings 114 are substantially larger than the cross-sectional area of the receptacles, extending beyond the longitudinal opening of the respective receptacle so that a workbody of greater depth than the receptacle can be accommodated. The wall segment 122b and the curved segments 122d, c primarily push directly against a workbody during rotation of the magazine assembly 36. The receptacle 120a is inclined down and back relative to the direction of the rotation; that is, the longitudinal axis of the receptacle, the receptacle walls and the flanges are inclined relative to the plane of the base plate 110 and to the axis of rotation of the magazine assembly, rearwardly of the direction of rotation of the assembly, considered in a downward direction. The receptacles are inclined as described between 1° and 15° from the vertical, preferably 2° to 3°. In operation the receptacle guides a workbody and a workbody follower in a downward, slightly inclined direction. A workbody W is shown in FIGS. 1 and 4 in phantom. While in this instance the entire workbody is within the receptacle, it can, depending upon its size and shape, extend outward beyond the plane of the flanges 124, 125 as long as it will fit through the opening 114 in the base plate 110.

Figure 3:
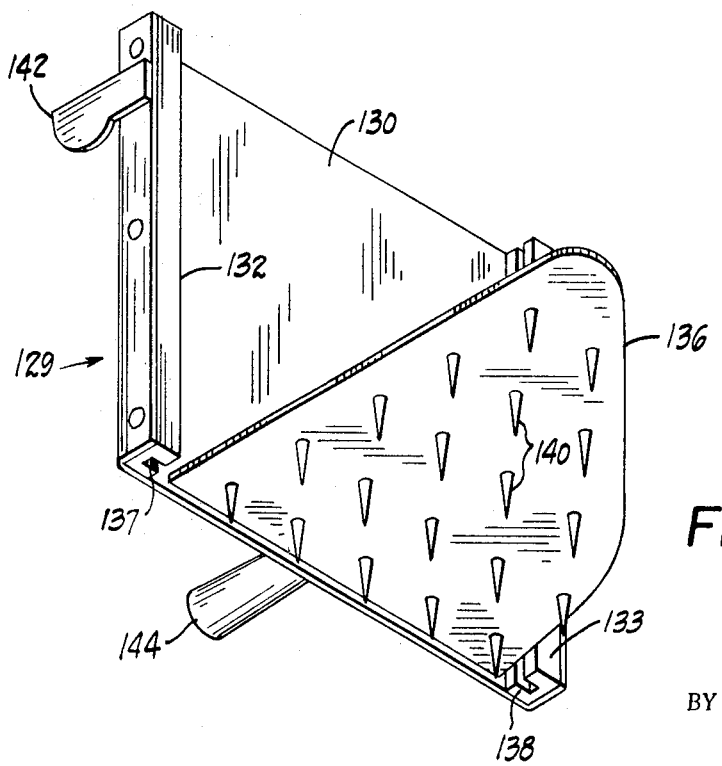
FIG. 3 is a perspective view of a workbody biasing member for use with workbody receptacles shown in FIGS. 1 and 2.

A workbody follower or biasing member 129 for use with each receptacle 120a is best shown in FIG. 3. The follower is constructed of a plate 130 with parallel guides 132, 133 along opposite side edges, and with an angularly related tongue 136 constructed to extend into the receptacle and to overlie the workbody. Each guide 132, 133 has an inwardly facing longitudinal groove 137, 138 respectively. The plate 130 spans the front of the receptacle 120a and the edges of the flanges 124, 125 of the receptacle are slidably received in the grooves 137, 138. The tongue 136 is inclined in an upward and inward direction relative to the longitudinal axis of the respective receptacle, as best illustrated in FIG. 4. Spikes 140 extend downward from the tongue 136 to engage an upper surface of a workbody in the receptacle. The angular orientation of the tongue 136 effectively resists tipping of the workbody out of the longitudinal receptacle opening and also positions the spikes so that those farthest from the plate 130 extend into the workbody to a lesser extent than those nearest the plate, facilitating removal of the spikes from the remnant of a workbody after the slicing operation is finished. The weight of the follower 129 rests upon the top of a workbody in the associated receptacle. Because the tongue is at the bottom edge of the plate 130, it will properly engage a workbody even if the workbody extends from the longitudinal opening of the receptacle. The inclination of the flanges tends to drive the follower downward when the assembly 36 is rotated and if contact of the workbody with the knife assembly 38 tends to lift the workbody in a vertical direction, the effective lifting force upon the workbody follower is reduced due to the inclination of the guides.

A projection or finger 142 extends generally horizontally from the side of the plate 130 adjacent the guide 132 that slides along the receptacle flange 125 adjacent the hub 112 of the rotatable assembly 36. This projection can be engaged by a lifting mechanism to be described subsequently, to raise the workbody follower 129 to facilitate loading or unloading the receptacle. In addition, handle 144 extends forward from the plate 130 for lifting the workbody followers individually.

Two other embodiments 120b, 120c of receptacles 120 are shown in FIGS. 7 to 10 of the drawings. In these embodiments, the longitudinal axis and the back portion of the receptacle extend perpendicular to the plane of a circular base plate 110a so that the workbody is sliced at right angles to its longitudinal axis.

Figure 7:
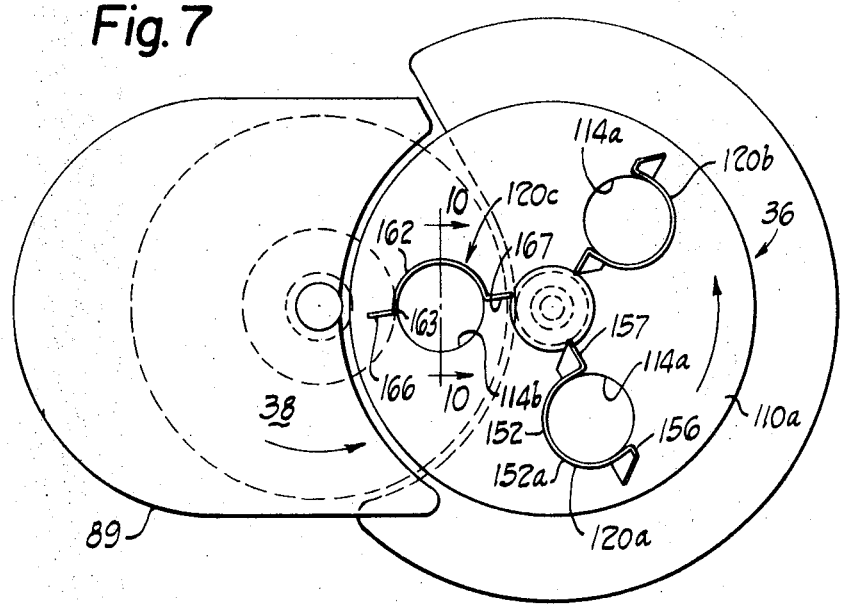
FIG. 7 is a plan view of the cutting apparatus of FIG. 1 with a modified magazine assembly.
Figures 8, 9, 10:
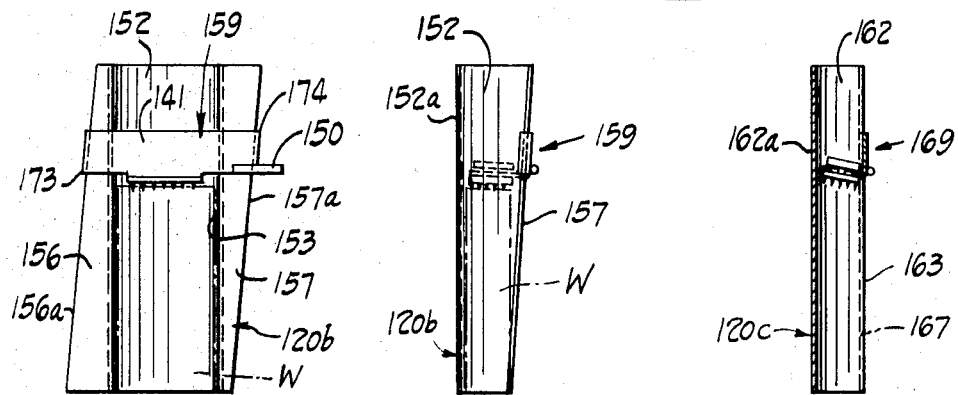
FIG. 8 is a front elevational view of another embodiment of a receptacle embodying the present invention, for moving workbodies in an endless path across a rotary knife assembly.
FIG. 9 is a side elevational view of the receptacle of FIG. 8.
FIG. 10 is a vertical sectional view of another embodiment of a receptacle, taken along the line 10–10 of FIG. 7 and looking in the direction of the arrows.

The receptacle 120b shown in FIGS. 7 to 9 is formed of an upright wall 152 in the shape by way of example of a partial cylinder, essentially semicircular in cross section. Other cross-sectional shapes are of course suitable. The wall 152 is positioned at the trailing edge (relative to the direction of movement) of one of a plurality of openings 114a in the circular base plate 110a. The openings 114a in this embodiment are circular. A back portion 152a of the wall 152, which pushes directly against a workbody during rotation of the magazine assembly 36 and against which the workbody slides, is perpendicular to the plane of the circular base plate 110a. The partially cylindrical wall 152 forms a longitudinal opening 153 facing in the direction of movement of the receptacle. The longitudinal opening 153 is located in a plane inclined to the plane of the circular base plate 110a, rearward to the direction of movement in a downward direction from the top of the cylindrical wall 152. Flat flanges 156, 157 are formed on opposite sides of the longitudinal opening 153, extend in opposite directions and lie in the plane of the opening 153. These flanges form guides for a workbody follower or biasing member 159, shown resting on a workbody W, indicated in Phantom. The flanges 156, 157 have parallel outer edges 156a, 157a respectively, that are inclined in a downward and outward direction toward the periphery of the base plate. Thus, in this embodiment, the flanges 156, 157 are inclined both rearwardly and outwardly relative to the vertical element 152a, in a downward direction and guide the workbody follower along such a path.

The construction of the receptacle 120c is best understood from FIGS. 7 and 10. It is similar in construction in many respects to the receptacles 120b, being formed of an upright cylindrical portion or wall 162 that is semicircular in cross section and positioned to extend upward from the circular base plate 110a at a trailing edge of an opening 114b in the base plate. A back portion 162a against which a workbody slides and which acts to move a workbody in the direction of rotation of the rotatable assembly 36, is vertical; that is, perpendicular to the plane of the base plate 110a. In this embodiment, the cylindrical wall 162 forms a longitudinal opening 163 that lies in a plane perpendicular to the plane of the circular base plate 110 and parallel to the back portion 162a of the receptacle. Flanges 166, 167 extend outward in opposite directions from the longitudinal opening 163 in the plane of the opening, and are inclined in this plane in the same manner as the flanges 166, 167; that is, outward from adjacent the central area of the rotatable assembly 36 toward the periphery of the circular base plate 110 in a downward direction. The flanges 166, 167 serve to guide a workbody follower or biasing member 169 in a path inclined outwardly and downwardly relative to the rotatable assembly 36, in a plane perpendicular to the circular base plate 110a.

Figure 11:
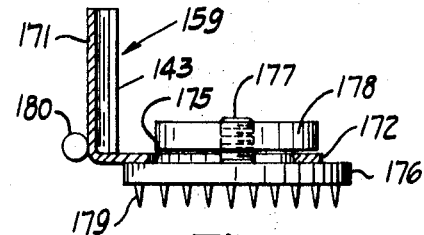
FIG. 11 is a side elevational view, with parts in section, of a workbody follower constructed in accordance with the present invention for use with the receptacle of FIGS. 8 and 9.

With reference now to FIGS. 8 and 11, the workbody follower 159 is constructed of a flat plate 171 arranged to slide along the guide flanges 156, 157, and an inwardly extending tongue 172 constructed to extend into the receptacle and overlie the workbody. The flat plate 171 extends across the front of the receptacle 120b, essentially parallel with the circular base plate 110a. Ends 173, 174 of the flat plate 171 are folded back to curve around the edges 156a, 157a of the guide flanges 156, 157. Clearance is provided to assure that the flat plate 171 will slide freely along the flanges of the receptacle 120b.

The tongue 172 of the follower 159 extends inwardly of the receptacle 120b from the bottom edge of the flat plate 171, and is substantially narrower than the opening 153 so that it can move from one side of the opening to the other as the flat plate 171 slides along the inclined edges 156a, 157a of the flanges. A relatively large aperture 175 is formed in the tongue 172 to permit relative movement of a plate 176 that is carried by the tongue 172 and which directly engages the workbody. The plate 176 is connected to the tongue 172 for relative movement in the plane of the tongue by a shaft 177 extending from the plate through the aperture 175. The shaft 177 is of relatively small cross section as compared with the dimension of the aperture 175 so that the interconnection does not limit the movement of the tongue along the inclined path of the guide flanges. The shaft 177 is threaded to receive a nut 178 that is larger than the aperture 175 and which retains the plate 146 connected with the tongue 172 and prevents relative vertical movement. Spikes 179 extend downward from the plate 176 and serve to secure the plate to a workbody carried in the receptacle. As shown in FIG. 11, the tongue 172 extends at essentially a right angle to the flat plate 171. As illustrated in FIG. 9, this results in the tongue 172 extending at an angle downward and forward relative to the vertical back portion 152a of the receptacle, since the guide flanges 156, 157 are inclined backward and downward. This angular orientation of the tongue 172 and flat plate 176 resists tipping of the workbody out of the receptacle, especially when the receptacle is stationary, because any tipping of the workbody will now require a vertical movement of the flat plate 171, notwithstanding the lost motion connection between the tongue 172 and flat plate 176.

A small rod or finger 180 extends generally horizontally from the face of the flat plate 171 of the workbody body follower, adjacent the flange 157 that is closest to the hue 112 of the rotatable assembly 36. This rod can be engaged by a lifting mechanism to be described subsequently, to raise the workbody follower 159 after a workbody has been severed into slices.

With the above described arrangement, the flat plate 171 and tongue 172 can slide downward and across the opening 153 and transversely of the central passageway of the receptacle 120b, in the path determined by the guide flanges 156, 157. At the same time, the plate 176 engaged with the work product in the receptacle can move in a vertical path within the receptacle. Downward forces applied to the flat plate 171 and tongue 172 by virtue of their mass, the movement of the receptacle in a circular path, and the inclination of the guides 156, 157, are transmitted through the plate 176 to the workbody and bias the body downward. If contact of the workbody with the knife assembly 38 tends to lift the workbody, the effective lifting force is reduced due to the inclination of the guides.

Figure 12:
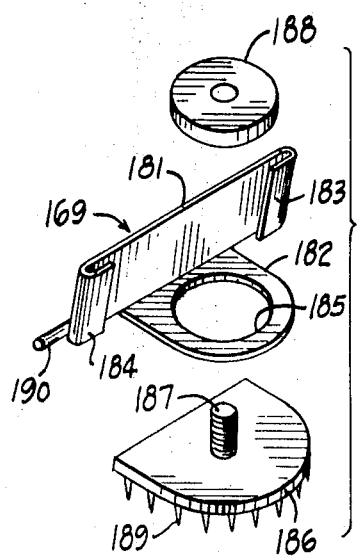
FIG. 12 is a perspective exploded view of another embodiment of a workbody follower, for use with the receptacle of FIG. 10.

The workbody follower 169 used in connection with the receptacle 120c is best shown in FIGS. 10 and 12 of the drawings. The follower 169 is constructed identically to the follower 159, except that a flat plate 181 that extends across the flanges 166, 167 of the receptacle is oriented at an acute angle to an inwardly extending tongue 182. As in the previously described embodiment, the workbody follower 169 includes bent ends 183, 184 of the plate 181, an aperture 185 in the tongue 182, a plate 186 having a shaft 187 that extends through the aperture 185, a nut 188 that secures the plate 186 to the tongue 185, and spikes 189 extending from the plate 186. A rod 190 extends from one side of the flat plate 181 adjacent the center of the rotatable magazine assembly 36 to facilitate lifting the workbody follower. The plate 181 is oriented at an acute angle with respect to the tongue 182 because this workbody follower is used with flanges 166, 167 which are in a plane perpendicular to the circular base plate 110. This angular relationship positions the tongue and plate 186 inclined downwardly and forward relative to the vertical back portion 162a of the receptacle 120c, to resist tipping of a workbody from the receptacle, as when the rotation of the magazine assembly 36 is stopped. In this embodiment, it will be apparent that relative movement between the tongue 182 and plate 186 is only required in a direction across the opening 163 and not transversely in a direction into the depth of the receptacle, as in the case of the receptacle 120b.

In all of the above embodiments, the receptacles are oriented so that the intersection of the plane of the longitudinal opening to each receptacle 120 and the circular base plate is offset from a radial line of the base plate, thus positioning the outer portion of the receptacle somewhat ahead of the inner portion relative to the direction of movement, as is most clearly evident from FIG. 2. This establishes a desirable relationship between the workbody, receptacle and cutting knife to assure effective cutting.

3. Follower Lifting Mechanism

A mechanism for lifting workbody followers associated with the receptacles, such as the followers 129, 159, 169, is shown in FIGS. 1 and 4. A nonrotatable vertical piston rod 196 of a fluid motor 198 extends through the tubular shaft 58 that drives the magazine 36. The fluid motor is connected at its lower end by a clevis 197 to a cross channel 198 of the housing 42. Conduits 200, 201 supply and exhaust fluid under pressure to and from the fluid motor to raise and lower the rod 196. If desired, vertical alignment of the rod 196 within the shaft 58 can be improved and wear reduced by providing bearings within the tubular shaft 58 at opposite ends, one such bearing being shown at 204 in FIG. 4.

The upper end of the vertical rod 196 carries a circular lifting disc 205 constructed to engage the horizontally extending rods or fingers 142, 180, 190 of the workbody followers when the rod 196 is moved upward from a lower position as shown in FIG. 1 and shown in solid in FIG. 4, to a raised position, indicated in phantom in FIG. 4. In the lower position, the disc 205 is located just above and slightly spaced from the top of the hub 112 of the circular base plate 110. With the arrangement described, an operator can actuate the fluid motor 198 with a control valve (not shown) when new workbodies W are to be inserted into the magazine assembly 36. The rod 196 raises the lifting disc 205 to raise each of the workbody followers from adjacent the bottom of the receptacles to the position near the upper ends of the receptacles and holds the followers in raised position. In cases where the workbody extends beyond the height to which the follower is lifted, the operator places the upper end of the workbody into the receptacle, lifts the follower with the workbody to the necessary height and places the lower end of the workbody into the opening 114 in the base plate. Since the followers are not connected to the lifting disc 205, individual followers may be raised in this manner to different levels above that to which the lifting disc 205 has raised them. When the control valve is returned to its initial position, the vertical rod 196 is lowered and the workbody followers are free to move down the receptacles and bias the workbodies downward.

A mechanism for preventing relative movement of the lifting rod 196 and the circular base plate 110 is shown in FIGS. 1 and 4 and provides a means for lifting the base plate 110 relative to the table 34 in order to clean the cutting apparatus. To this end, a slot or recess 208 is formed in the upper end of the hub 112. A threaded rod 209 is pivoted at its lower end within the slot 208 and is of a length sufficient to extend beyond the top of the hub 112 when the rod is pivoted to a vertical position as shown in phantom in FIG. 4. A radial slot (not shown) is provided in the lifting disc 205 to receive the threaded rod 209 when it is pivoted to a vertical position and when the slot in the disc is aligned with the slot 208 in the hub 112. A wingnut 210 on the rod 209 then secures the lifting disc 205 in the fixed relationship to the hub 112. When the fluid motor 198 is operated to raise the rod 196, the entire rotatable assembly 36 is raised and the table 34 and other portions of the adjacent apparatus can be conveniently and thoroughly cleaned.

4. Work Body Backup Device

Referring now to FIGS. 13—16, an optional backup device is shown in the form of the circular disc 86 mentioned previously in connection with FIG. 1. The disc 86 is located beneath the circular base plate 110 of the rotatable magazine assembly, is carried for rotation therewith by the shaft 58, and is constructed to abut the trailing edge of a lower portion of a workbody W extending from each receptacle. The circular disc 86 is preferably formed of a synthetic resin and is relatively rigid in the plane of the disc but flexible transversely to the plane. The diameter of the circular disc 86 is substantially equal to the diameter of the base plate 110 that supports and moves the receptacles 120 in a circular path. Openings 212 are provided in the disc 86 beneath each of the receptacles carried by the magazine assembly. A substantial portion 212a of the periphery of the opening 212 directly abuts the trailing edge of the workbody portion that extends below the base plate 110.

The radius of the disc 86 is slightly greater than the distance between the shaft 58 of the magazine assembly and the shaft 63 of the knife assembly. This is because the disc must have adequate dimension beyond the openings 212 to assure sufficient strength and rigidity. Because of this greater radius the conical deflector 84 referred to earlier is provided on the shaft 63 of the knife assembly, directly beneath the knife blade support member 80. The conical deflector surface 85 distorts a portion of the disc that extends between the two shafts 58, 63 downward so that the disc clears the shaft 63 of the rotary knife assembly. Since this deflection occurs at a location subsequent to the location at which sections are severed from a workbody W, the deflection of the disc has no adverse effect upon its function in backing up the section of the workbody being severed.

A plurality of inclined bladelike deflectors 216 are located along a portion of the edge 88 of the table 34 that receives the workbody after it passes across the knife assembly. The deflectors 216 extend toward the knife blade and downward providing in effect a beveled contour to a portion of the edge surface 88 of the table 34. The deflectors assure that the disc 86 returns to its flat configuration as the distorted portion passes back over the table 34. The deflectors 216 are especially important in the event the disc should break, as at the thin portion just beyond an opening 212, because without a continuous surface the portion of the disc deflected downward would tend to remain at a lower level than the table 34, in which event it would strike the edge 88 and interfere with further rotation of the magazine assembly 36.

5. Receptacles and Receptacle Inserts without Workbody Followers

Figure 17:
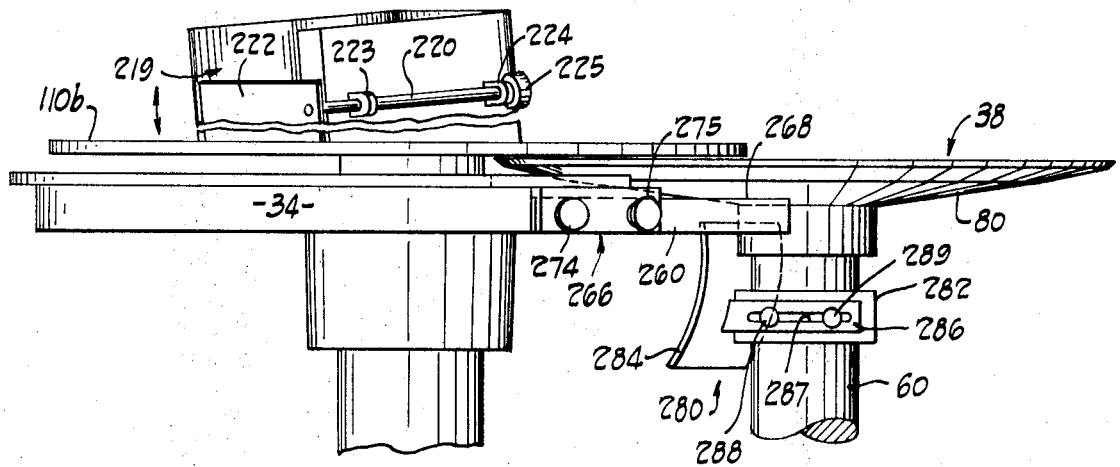
FIG. 17 is a fragmentary elevational view showing the relationship of a supplementary knife blade with the rotary knife assembly and table of the cutting apparatus of the present invention and also showing a curved plate for deflecting severed slices, and a further embodiment of a workbody receptacle.
Figure 19:
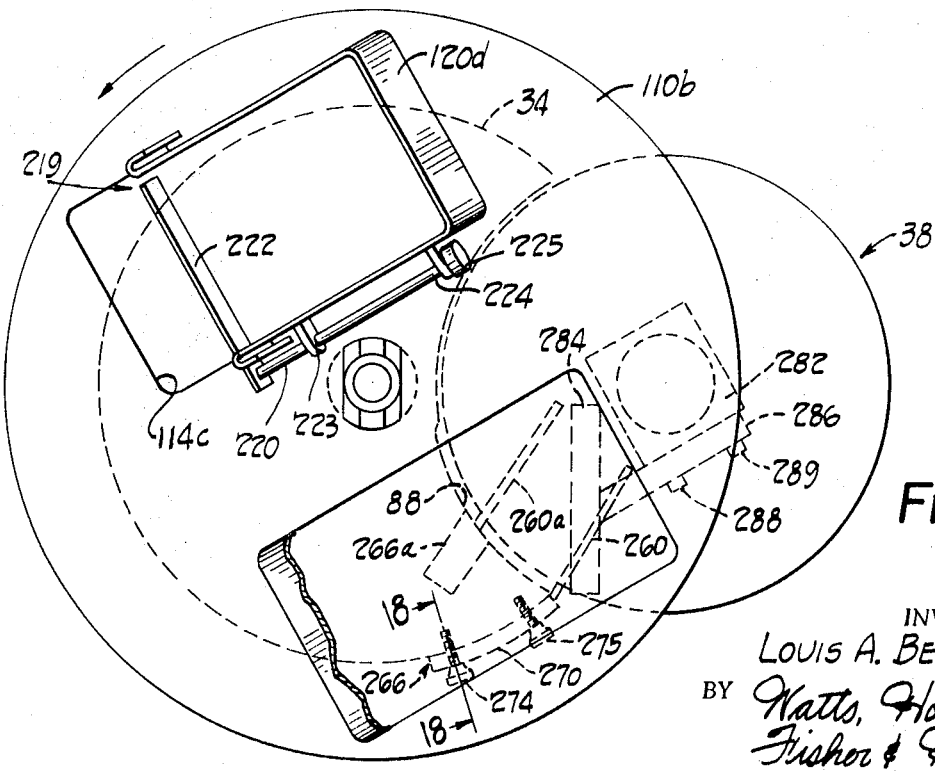
FIG. 19 is a partial plan view of cutting apparatus embodying the present invention, illustrating the manner in which one or more supplementary knife blades can be used in combination with the rotary knife assembly to cut severed slices of a meat body into separate pieces.

A rectangular receptacle 120d for carrying large blocks of frozen meat is shown in FIGS. 17 and 19. The receptacle 120d is inclined in the same manner as described in connection with the magazine 120a, cooperates with a rectangular opening 114c in a base plate 110b and has a longitudinal opening 219 and a product retaining means such as a rod 220 with a transverse product-retaining plate 222 secured at one end. The rod is supported for rotational movement about its longitudinal axis and at an inclined angle by brackets 223, 224 on one side of the receptacle. A stop 225 at the opposite end from the retaining plate restrains the rod against longitudinal movement toward the receptacle opening 219. The plate 222 is generally rectangular in shape and a lower edge rests on the base plate 110b across the opening 114c when the plate is positioned across the receptacle opening 219. The plate 222 and rod 220 can be pivoted about the rod axis to swing the plate away from the opening 219 so that a work body can be inserted into the receptacle through the opening 219.

Figure 20:
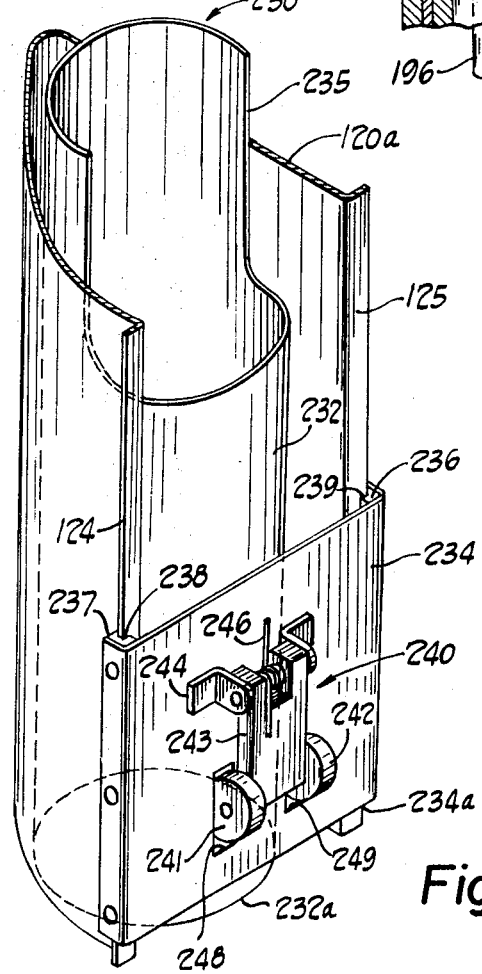
FIG. 20 is a perspective view of a receptacle as shown in FIGS. 1 and 2, with an insert constructed to receive and position a cylindrical workbody.

A receptacle insert 230 for adapting the receptacle 120a to handle cylindrical workbodies is shown in FIG. 20. While cylindrical workbodies, especially if frozen, can be used directly in the receptacle 120a, where high production slicing of products such as hamburger is contemplated, or where the product is not frozen, a cylindrically shaped receptacle is advantageous. The insert 230 includes a cylindrical tube 232 and an attached locating plate 234 for securing and locating the tube in position within the receptacle. An upper portion of the tube is cut away at 235 to facilitate inserting a workbody. The locating plate 234 is of similar construction to the plate 130 of the follower 129, and has parallel guides 236, 237 along opposite side edges, each with an inwardly facing groove 238, 239, respectively, which slidably receive the edges of flanges 124, 125 of the receptacle. The plate 234 is attached to the tube 232 at a location such that the lower end 232a of the tube is adjacent the lower edge of the receptacle 120a within the opening 114 of the base plate 110 while the lower edge 234a of the locating plate rests on the upper surface of the base plate. The insert 230 is placed within the receptacle by aligning the grooves 238, 239 with the flanges 124, 125 and sliding it downward from the top of the receptacle. It is removed by sliding it longitudinally toward the top of the receptacle.

In the preferred embodiment shown, an assembly 240 is mounted on the locating plate 234 and serves to bias a workbody within the insert toward the back, or trailing surface thereof. The assembly 240 includes two spaced rollers 241, 242 on an arm 243 pivotally secured to the outside surface of the locating plate by a bracket 244 biased by a spring 246 toward an inward position. Slots 248, 249 in the locating plate receive the rollers so that the rollers bear directly against the workbody. This arrangement permits the cylindrical tube 232 to be large enough to accommodate workbodies that vary in diameter, while assuring that the workbody is held firmly against the back of the tube so the slices can be severed uniformly. The rollers freely rotate to permit the workbody to move longitudinally within the tube 232.

Figure 21:
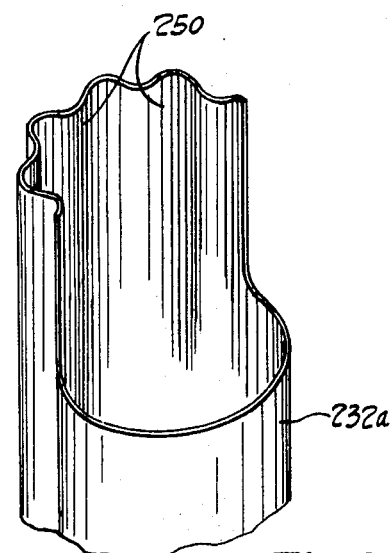
FIG. 21 is a top view of another workbody receptacle embodying the present invention.

A modified cylindrical tube 232a for use as a receptacle insert is shown in FIG. 21. The backwall or trailing portion of the tube 232a is fluted to provide spaced, longitudinally extending, inwardly directed, riblike surfaces 250 against which a workbody bears during a slicing operation. The riblike surfaces reduce the area of surface-to-surface contact between the receptacle and workbody, minimizing frictional contact so that the workbody readily slides longitudinally without a biasing member or follower. This fluted or ribbed construction can also be directly incorporated into the receptacle construction to accomplish the same purpose. Alternative means of providing limited surface contact, such as rods or the like secured to the inside back or trailing surface of a receptacle or receptacle insert can be used, as well.

e. Supplementary Knife

Figure 18:
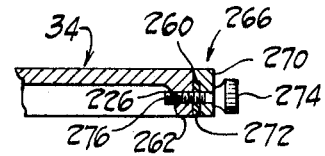
FIG. 18 is a partial sectional view of a mounting bracket for the supplementary knife of FIG. 17, taken along the line 18–18 in FIG. 19 and looking in the direction of the arrows.

In order to cut meat bodies into chucks, it is desirable to sever sections from a meat body carried by the rotatable assembly and simultaneously cut the severed section into two or more pieces longitudinally of its direction of movement. A knife blade 260 constructed and arranged as shown in FIGS. 17—19, can be provided to accomplish this. The blade 260 is generally flat, oriented in a vertical plane, and extends outward from the edge 88 of the table 34, essentially tangent to a peripheral flange 262 of the base 34a of the table 34. One end of the blade 260 is secured by a bracket 266 to the peripheral flange 262 of the table 34. The opposite end of the blade extends beneath and closely adjacent to the lower surface of the support member 80 of the rotary knife assembly 38. A cutting edge 268 of the blade 260 faces upward. As best shown in FIG. 19, the blade extends in a peripheral direction in which a workbody moves when rotated with the rotatable magazine assembly 36. In the embodiment of FIGS. 17 and 19, large meat blocks are carried in the rectangular magazines 120d, which extend radially outward beyond the knife blade 260 as they pass across the rotary knife assembly 38. With the knife blade 260 extending in the direction shown in FIG. 19, any resistance of the blade 260 to the rotation of the workbody is slight, and if desired, the blade 260 can be curved with a radius equal to its distance from the axis of rotation of the workbodies, to further reduce any resistance of the blade to workbody movement.

Additional blades such as the blade 260a shown in FIG. 19 can be provided along the edge 88 of the table 34, to extend beneath the rotary knife assembly 38 to slice severed sections of the meat body into a greater number of pieces. Such additional blade or blades can be secured by suitable brackets 266a mounted to the bottom surface of the table 34. As a section of the workbody is severed by the rotary knife assembly 38, it is directed downward by the inclined lower surface of the support member 80 and across the cutting surface 268 of the knife blade 260 and any additional knife blades 260a. Thus, the portion severed transversely from the workbody is sliced longitudinally as it is separated from the workbody, resulting in a plurality of smaller pieces being formed.

As best shown in FIGS. 17 and 18, the bracket 266 consists of a generally rectangular clamp member 270 with a longitudinal recess 272 of a depth sufficient to receive the thickness of the blade 260. Two threaded fasteners 274, 275 extend through the rectangular clamp member 270 and the blade 260 and are received in threaded apertures 276 in the flange 262 of the table 34. This allows the clamp member to be loosened and the blade adjusted longitudinally to an inoperative position.

f. Product Deflector Assembly

A product deflector assembly 280, as shown in FIG. 17, is constructed and arranged to sharply bend and thereby break sliced portions of a workbody into smaller pieces during a severing operation. The position of the deflector can be adjusted so that it does not so abruptly bend the sliced product, which is then deflected rather than broken. As shown, a support bracket 282 is secured to the support sleeve 60 of the rotary knife assembly 38. A curved deflector plate 284 is secured to the bracket 282 by an extending arm 286. An elongated slot 287 in the arm 286 receives two spaced fasteners 288, 289 that are threadedly received in the bracket and provides adjustment of the plate 284 toward and away from the area where the rotary knife severs slices from the workbody. The deflector plate faces oncoming slices and is concave so as to bend the slices downward into a reverse bend. With the plate closely adjacent the edge 88 of the table 34 where the slices are being severed, the bending is very abrupt and causes the severed slice to break, especially when the workbody is frozen. Where the slice is also cut into strips by blades 210, 210a, small chunks are produced. If the deflector is moved away from a position adjacent the edge 88, the slice tends to flex or curve rather than break and is directed downward, where it can be received on a conveyor or the like.

g. Knife Sharpening Assembly

A grinding wheel assembly 290 and a hone assembly 292 for sharpening the knife blade 88 are secured to the cover 44 of the stationary support 32.

Figure 22:
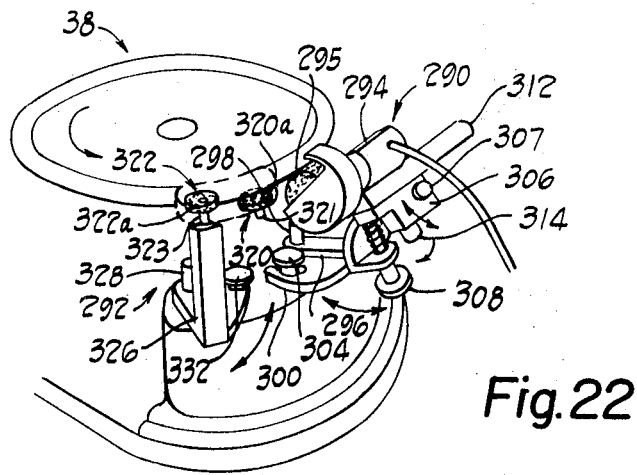
FIG. 22 is a fragmentary perspective view of the apparatus of FIG. 1 showing a sharpening wheel assembly and hone assembly used to sharpen the rotary knife assembly of the present cutting apparatus.
Figure 23:
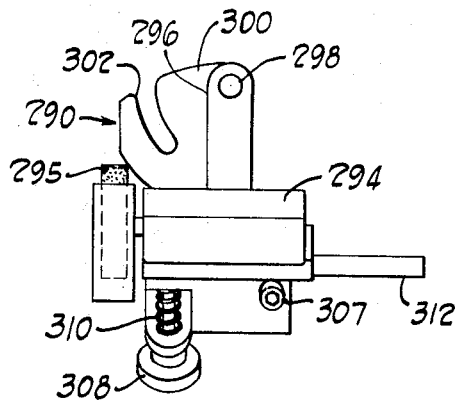
FIG. 23 is a plan view of the sharpening wheel assembly of FIG. 22 with parts omitted.
Figure 24:
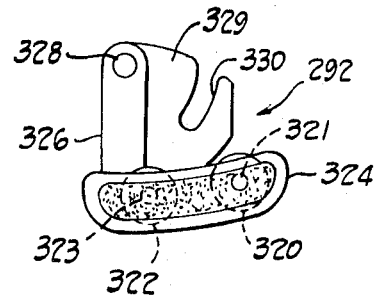
FIG. 24 is a plan view of the hone assembly of FIG. 22 with parts omitted.

The grinding wheel assembly includes an electric motor 294 with a grinding wheel 295 supported for movement into and out of operating position by a bracket 296 pivotable about a vertical pin 298. A generally horizontal guide plate 300 forming a lower part of the bracket has an arcuate slot 302 to permit the guide plate to slide beneath a clamping hand wheel 304 that holds the bracket in an operative or inoperative position. A support block 306 on the bracket is pivotable about a shaft 307 for adjustment by a hand screw 308 carried on the bracket 296. A coil spring 310 biases the block clockwise about the shaft 307 in the orientation of FIG. 22. With this arrangement, grinding wheel wear is compensated through adjustment of the hand screw. The motor 294 and a handle 312 are carried on the block 306 by a pivot shaft 314 that extends in a direction transverse to the axis of the grinding wheel. The handle moves the motor and grinding wheel about the pivot shaft 314, moving the peripheral face of the grinding wheel across the lower edge portion of the knife blade.

The hone assembly 292 includes a wheel 320 on an inclined shaft 321 and a wheel 322 on a vertical shaft 323, each supported for free rotation and for axial movement within a housing 324 carried by a bracket 326. The bracket 326 is pivotably supported on the cover 44 for movement between operative and inoperative positions by a vertical pin 328. A lower, horizontal guide plate 329 of the bracket as an arcuate slot 330 that permits the plate to slide beneath a clamping handwheel 332, which holds the assembly in a given pivoted position. Each shaft 321, 322 extends below the housing 324 so that it can be moved axially by hand. The wheel and shaft 320, 321 are biased downward by a spring (not shown) to a position out of contact with the rotary knife blade and the wheel and shaft 322, 323 are biased upward by a spring (not shown) to a position out of contact with the knife blade. In operation, the hone assembly is swung into operative position adjacent the edge of the knife blade 82 after the blade has been sharpened by the grinding wheel assembly 290. The wheel 320 is moved upward by hand movement of the shaft 321 to engage an inclined annular surface 320a of the wheel with the underside of the blade 82, and the wheel 322 is moved downward by hand movement of the shaft 323 to bring a flat lower radial surface 322a into contact with the top surface of the knife blade. Normally each wheel is operated separately. Thereafter, the hone assembly is pivoted away from the knife blade.

h. Summary of Operation

Although it is believed that the operation of the cutting apparatus described above will be evident from the preceding detailed description, the following is a brief summary of the operation.

Workbodies, such as meat bodies or other comestible products are placed in each of the receptacles, such as receptacles 120a of the rotatable magazine assembly 36, shown in FIG. 1. This is accomplished by raising the workbody followers or biasing members 129 through vertical movement of the rod 196 and lifting disc 205, which the operator accomplishes by actuating the fluid motor 198. The workbodies are inserted into the front openings of the receptacles, the lifting rod 196 is then lowered and the workbody followers rest upon the upper surface of the workbodies. The lower surface of the workbodies pass through the openings 114 in the circular base plate 110 of the magazine assembly, and rest either on the table 34 or upon the surface of the knife assembly 38.

The height of the table 34 is adjusted relative to the edge of the knife blade 82 by movement of the operating handle 106. This establishes the thickness of the portions to be severed from the workbodies. The drive motor 66 is then started, causing the rotatable magazine assembly 36 and the rotary knife assembly 38 to rotate in the directions shown by the arrows in FIG. 2. As will be apparent from the relatively small size of the gear 72 attached to the shaft 63 of the knife assembly 38, and the larger diameter gear 76 attached to the shaft 58 of the magazine assembly 36, the knife of the blade rotates at a relative high speed as compared to the magazine assembly.

As each workbody moves in a circular path from the surface of the table 34 into cutting engagement with the rotary knife assembly 38, a section of the workbody is severed by the knife. The remaining portion of the workbody is supported upon the upper surface of the knife assembly and after passing over the knife assembly drops down to the table 34 and is then moved again past the knife. The workbody followers or biasing members 129 assure that the workbodies are biased downward as they are rotated so that slices of uniform thickness are severed. The weight of the workbody followers is supplemented by an additional force which is greatest upon the initial rotation of the magazine assembly, as the inertia of the workbody follower resists rotation by the receptacle when the magazine assembly is rotated. In addition, the workbody followers 129 also tend to resist any upward movement of the workbody because of the downward and backward inclination of the guide members.

Where receptacles 120b or 120c are used the weight of the workbody followers is supplemented by a component of centrifugal force created by the rotation of the magazine assembly and the inclination of the outer edges of the outer edges of the guide flanges 156, 157 or 166, 167. In the case of the receptacles 120b the weight of the workbody followers is supplemented by both the rearward and the outward inclination of the guides.

When the flexible disc 86 is used beneath the base plate 110 of the magazine assembly 36, a portion of the disc abuts the trailing surface of that portion of each workbody that extends beneath the base plate. This disc resists any tendency of the portion of the workbody being severed from moving backward relative to the remainder of the workbody. As a result, the disc 86. As a result, the disc 86 inhibits the tearing of the portion being severed from the workbody as the cut is almost completed.

Where the knife blade 260 is used in conjunction with the rotary knife assembly 38 to cut severed sections into separate pieces during the cutting operation, rotation of the magazine assembly 36 forces portions being severed from the workbody to pass beneath the rotary support member 80 and along the cutting surface 268 of the blade 260. The inclination of the lower surface of the disc-shaped support member 80 forces severed portions of the workbody downward at the same time, and thereby assures that the severed portions will be cut into separate pieces by the blade 210. The product deflector 280 is typically used in conjunction with the knife blade 260 to break up slices into small pieces by locating the deflector plate 284 closely adjacent the edge of the knife blade 260.

From the above it will be apparent that a cutting apparatus of improved construction has been provided that accomplishes the above-mentioned objects and embodies advantageous features that assure efficient cutting of workbodies and which is adaptable to workbodies of different sizes and shapes.

While preferred embodiments of the present invention have been described with particularity, it will be understood that various modifications or alterations may be made therein without departing from the spirit and scope of the invention, as set forth in the appended claims.

I claim:

1. An improved receptacle for slidably receiving a comestible workbody, such as a meat body or product, especially one that has bones or is frozen, and which in use carries the workbody in a curved endless path past severing means, is oriented with an upright longitudinal axis and is moved about an upright axis displaced from the longitudinal axis; said receptacle being elongated and having: a workbody passageway along the longitudinal axis; an open discharge end at one end of the passageway; a longitudinally extending open portion; guide means along said open portion externally of said passageway for guiding movement of a biasing member adapted to engage a workbody in said receptacle; and a biasing member engaged with and movable along said guide longitudinally of the open portion and workbody passageway in a sufficiently friction free relationship to permit movement of said member therealong under its own weight, said member extending through said member there longitudinally extending open portion and being located at least partially within said workbody passageway.

2. An improved receptacle for slidably receiving a comestible workbody, such as a meat body or product, especially one that has bones or is frozen, and which in use carries the workbody in a curved endless path past severing means, is oriented with an upright longitudinal axis, and is moved about an upright axis displaced form the longitudinal axis; said receptacle being elongated and having: a workbody passageway along the longitudinal axis; an open discharge end at one end of the passageway; a guide along the workbody passageway, said guide being inclined with respect to the longitudinal axis of the receptacle; and a biasing member movable under its own weight along the guide longitudinally and transversely of the workbody passageway and located at least partially within the workbody passageway.

3. An improved receptacle for slidably receiving a comestible workbody, such as a meat body or product, especially one that has bones or is frozen, and which in use carries the workbody in a curved endless path past severing means, is oriented with an upright longitudinal axis, and is moved about an upright axis displaced from the longitudinal axis; said receptacle being elongated and having: a workbody passageway along the longitudinal axis; an open discharge end at one end of the passageway; a guide along the workbody passageway, said guide being inclined with respect to the longitudinal axis of the receptacle; a biasing member movable along the guide longitudinally and transversely of the workbody passageway and located at least partially within the workbody passageway; an element to be carried by the work product and fixed with respect thereto; and means connecting the said element with the biasing member to permit transverse movement of the biasing member relative to the workbody passageway independently of the said element.

4. An improved receptacle for slidably receiving a comestible workbody, such as a meat body or product, especially one that has bones or is frozen, and which in use carries the workbody in an endless path past severing means, said receptacle being elongated, having an open discharge end, an elongated axially extending opening, and a guide extending longitudinally adjacent said axially extending opening, said guide and said receptacle being generally upright and inclines with respect to the vertical so that the axial opening faces slightly downward, and a biasing member movable under its own weight along the guide, extending through said axial opening, and in part located within the receptacle.

5. A receptacle as defined in claim 4 wherein the biasing member has a downwardly facing surface within the receptacle with depending pointed projections for engaging the workbody, the pointed ends thereof being spaced progressively farther from the open discharge end inwardly from the axially extending opening.

6. A receptacle as defined in claim 4 wherein the inner surface of the receptacle at a location opposite the longitudinally extending opening is longitudinally fluted.

7. An improved receptacle for slidably receiving a comestible workbody, such as a meat body or product, especially one that has bones or is frozen, and which in use carries the workbody in an endless path past severing means, said receptacle being elongated, having an open discharge end, an elongated axially extending opening, and a guide extending longitudinally adjacent said axially extending opening, said guide and said receptacle being oriented generally upright in use and at least said guide being inclined downward and rearward relative to the direction in which the axial opening faces when the receptacle is upright, and a biasing member movable substantially freely along said guide, extending through said axial opening, and in part located within the receptacle.

8. In an apparatus for severing sections from a comestible workbody, such as a meat body or product, especially one that has bones or is frozen: a support means, a workbody carrier assembly rotatably supported by said support means for moving a workbody in a horizontal endless path, knife means having a cutting edge extending transversely to and located in the path of movement of the workbody for severing a section from the workbody as the latter is moved therepast by said carrier assembly, means operatively connected with said carrier assembly for rotating the same, said carrier assembly including an upright receptacle with a longitudinal workbody passageway for slidably receiving the workbody, said receptacle having a discharge end disposed above said cutting edge of said knife means and through which the workbody passes, an elongated opening in the receptacle extending longitudinally thereof, guide means along said elongated opening inclined with respect to the vertical, and a biasing member movable under its own weight along said guide means and in part located within the receptacle.

9. In an apparatus for severing sections from a comestible workbody, such as a meat body or product, especially one that has bones or is frozen: a support means, a workbody carrier assembly rotatably supported by said support means for moving a workbody in a horizontal endless path, knife means having a cutting edge extending transversely to and located in the path of movement of the workbody for severing a section from the workbody as the latter is moved therepast by said carrier assembly, means operatively connected with said carrier assembly for rotating the same, said carrier assembly including a lower rotatable support plate and upright receptacle means with a longitudinal workbody passageway for slidably receiving the workbody and a discharge end disposed above said cutting edge of said knife means and through which the workbody passes, an elongated opening in the receptacle means extending longitudinally thereof, and a biasing member movable along said guide means and in part located within the receptacle means, said plate having an aperture aligned with the discharge end of said receptacle means and extending beyond the receptacle means at the location of the elongated opening so as to receive portions of a workbody in said receptacle means that extend outward through said elongated opening.

10. In an apparatus for severing sections from a comestible workbody, such as a meat body or product, especially one that has bones or is frozen: a support means, a workbody carrier assembly rotatably supported by said support means for moving a workbody in a horizontal endless path, knife means having a cutting edge extending transversely to and located in the path of movement of the workbody for severing a section from the workbody as the latter is moved therepast by said carrier assembly, means operatively connected with said carrier assembly for rotating the same, said carrier assembly including upright receptacle means with a longitudinal workbody passageway for slidably receiving the workbody, said receptacle means having a discharge end disposed above said cutting edge of said knife means and through which the workbody passes, an elongated opening in the passageway extending longitudinally of the receptacle, and guide means along said elongated opening, said elongated opening and guide means being inclined downward and rearward relative to the direction of rotatable movement of the workbody carrier assembly and a biasing member freely slidable along the guide means and in part located within the receptacle.

11. In an apparatus for severing sections from a comestible workbody, such as a meat body or product, especially one that has bones or is frozen: a support means, a workbody carrier assembly rotatably supported by said support means for moving a workbody in an endless path, knife means having a cutting edge extending transversely to and located in the path of movement of the workbody for severing a section from the workbody as the latter is moved therepast by said carrier assembly, means operatively connected with said carrier assembly for rotating the same, said carrier assembly including receptacle means for slidably receiving the workbody, said receptacle means having a discharge end disposed above said cutting edge of said knife means and through which the workbody passes, said receptacle means having vertical interior surface means for supporting the workbody vertically and guide means inclined with respect to the vertical interior surface, and a biasing member movable along the guide means and in part located within the receptacle, said guide means urges the biasing member downward.

12. Apparatus as defined in claim 11 having guide means inclined radially outward of the said endless path from an upper location adjacent the receptacle to a lower location and also inclined downward and rearward in a direction opposite to the direction of rotation of the carrier assembly.

13. In an apparatus for severing sections from a comestible workbody, such as a meat body or product, especially one that has bones or is frozen: a support means, a workbody carrier assembly rotatably supported by said support means for moving the workbody in an endless path, rotary knife means rotatably supported by said support means and having a cutting edge in a plane extending transversely to and located in the path of movement of the workbody for severing a section from the workbody as the latter is moved therepast by said carrier assembly, power means operatively connected with said carrier assembly and said knife means for rotating the same, said carrier assembly including receptacle means for slidably receiving the workbody, said receptacle means having a discharge end disposed above said cutting edge of said knife means and through which the workbody passes, a support member disposed below said discharge end and the cutting edge of said knife means for supporting the workbody while it is moved through a portion of its endless path by said carrier assembly, the position of said support member determining the thickness of the section severed from the workbody, a rack supporting the support member for movement toward and away from the plane of the cutting edge of the knife means, a gear engaged with the rack, means to rotate the gear to move the rack and support member, a sleeve extending from the support member toward the support means and enclosing the rack, and adjustable stop means including cooperable members on the support member and the support means to limit movement of the support member between two positions relative to the knife means, which positions define a maximum and minimum thickness of sections of the workbody to be severed.

14. In an apparatus for severing sections from a comestible workbody, such as a meat body or product, especially one that has bones or is frozen: a support means, a workbody carrier assembly rotatably supported by said support means for moving a workbody in an endless path, knife means having a cutting edge extending transversely to and located in the path of movement of the workbody for severing a section from the workbody as the latter is moved therepast by said carrier assembly, means operatively connected with said carrier assembly for rotating the same, said carrier assembly including receptacle means for slidably receiving the workbody, said receptacle means having a discharge end disposed above said cutting edge of said knife means and through which the workbody extends, and means carried by the rotating carrier assembly below the cutting edge of the knife means and including a surface for engaging the workbody adjacent the portion that is last to be severed during movement of the carrier assembly past the knife means.

15. Apparatus as defined in claim 14 wherein the said means for engaging the workbody is thin and flat in a plane perpendicular to the axis of rotation of the carrier assembly, is essentially rigid in said plane and flexible transversely thereof, and means adjacent the knife means to flex the said thin and flat means transversely of the said plane after a section of the workbody has been severed and while the said thin and flat means is moving with the carrier.

16. Apparatus as defined in claim 15 wherein the knife means is a rotary blade, the said thin and flat means that engages an edge portion of the workbody is a circular disc having an opening beneath the discharge end of the said receptacle, and the said flexing means is a beveled disc below and rotatable concentrically with the knife means.

17. In an apparatus for severing sections from a comestible workbody, such as a meat body or product, especially one that has bones or is frozen: a support means, a workbody carrier assembly rotatably supported about a central upright axis for moving a workbody in an endless path, a plurality of workbody receptacles forming a part of said assembly each having a lower workbody discharge end, knife means having a cutting edge in the path of the workbodies for severing sections therefrom as they are moved by the carrier assembly, means operatively connected with the carrier assembly for rotating the same, a biasing member associated with each receptacle movable downward to bias a workbody through the discharge and movable upward to receive a new workbody in the receptacle, and a lifting member vertically movable relative to the carrier assembly engageable with each biasing member and movable between a lower position out of contact with the biasing members and a raised position where it contacts and lifts the biasing members so that new workbodies can be positioned in the receptacles.

18. Apparatus as defined in claim 17 including means to limit the vertical movement of the lifting member relative to the carrier assembly so that upward movement of the lifting member lifts the carrier assembly relative to the support means.

19. In an apparatus for severing sections from a comestible workbody, such as a meat body or product, especially one that has bones or is frozen: a support means, a workbody carrier assembly rotatably supported by said support means for moving a workbody in an endless path, means for rotating the carrier assembly, first knife means for severing a section from the workbody as the workbody is moved past the first knife means, said first knife means having a cutting edge and a relatively flat support surface across which the workbody moves as a section is severed and lying in a plane in the path of movement of the workbody, and a beveled surface constructed to direct the severed section away from the said plane and workbody, second knife means behind the cutting edge of the first knife means with a cutting edge adjacent the beveled surface to slice the severed section in a direction transverse to the said plane as the severed section is directed away from the workbody.

20. Apparatus as defined in claim 19 including a workbody receptacle means forming a part of the carrier assembly, said receptacle means having a discharge end through which the workbody passes, a support member disposed beneath the discharge end of the receptacle for supporting a workbody during a portion of its movement through said endless path, and terminating adjacent the cutting edge of the first knife means, and means secured to said support member adjacent the first knife means for supporting the second knife means.

21. Apparatus as defined in claim 20 wherein the means for supporting the second knife means supports a cutting blade for movement between an operative position behind the cutting edge of the first knife means adjacent the beveled surface thereof and an inoperative position in front of the cutting edge and covered by the support member.

22. An improved receptacle for slidably receiving a comestible workbody, such as a meat body or product having a bone and typically frozen, and which in use carries the workbody in a path past a severing means for severing a section of the workbody, said receptacle being elongated in a direction transverse to the direction in which it is moved during use, having an elongated opening extending substantially the length of the receptacle, and the transverse cross-sectional shape comprising a first straight wall segment extending from the elongated opening, a second straight wall segment extending transversely thereof at an acute angle thereto and a curved wall segment joining said first and second straight wall segments, and longitudinally extending flange portions on opposite sides of said elongated opening.

23. In an apparatus for severing sections from a comestible workbody, such as a meat body or product, especially one that has bones or is frozen: a support means, a workbody carrier assembly rotatably supported by said support means for moving a workbody in an endless path, knife means having a cutting edge extending transversely to and located in the path of movement of the workbody for severing a section from the workbody as the latter is moved therepast by said carrier assembly, means operatively connected with said carrier assembly for rotating the same, said carrier assembly including upright receptacle means with a longitudinal workbody passageway for slidably receiving the workbody, said receptacle means having a discharge end disposed above said cutting edge of said knife means and through which the workbody passes, an elongated opening in the passageway extending longitudinally of the receptacle and guide means along the workbody passageway from the vertical, a biasing member movable along the guide means and in part located within the receptacle, said inclined guide means urging the biasing member downward upon rotation of the carrier assembly, a workbody backup means at the discharge opening of the receptacle means positioned to contact an extending portion of the workbody being severed along a surface thereof that is trailing with respect to the direction of movement of the carrier assembly past the knife means, whereby when a portion of the workbody is severed a trailing portion is not torn at the finish of the operation but rather is cleanly severed, a lifting member vertically movable relative to the carrier assembly engageable with a biasing member and movable between a lower position out of contact with the biasing member and a raised position where it contacts and lifts the biasing member so that a new workbody can be positioned in the receptacle, and a second knife means behind and beneath the first said knife means with a cutting edge positioned to slice a severed section of the workbody in a direction transverse to the extent of the cutting edge of the first knife means.

24. An improved receptacle for slidably receiving a comestible workbody, such as a meat body or product, especially one that has bones or is frozen, and which in use carries the workbody in an endless path past severing means, said receptacle being elongated, generally tubular, having an open discharge end and a side opening, a roller carried by and outside of said receptacle for limited relative movement transversely thereof, a portion of said roller extending through said side opening, and means yieldably biasing said roller inwardly of said receptacle, whereby said roller will ride against and bias a workbody within said receptacle against an inner surface thereof without appreciably retarding axial movement of the workbody relative to the receptacle.

25. In an apparatus for severing sections from a comestible workbody, such as a meat body or product, especially one that has bones or is frozen: a support means, a workbody carrier assembly rotatably supported by said support means for moving a workbody in a horizontal endless path, knife means having a cutting edge extending transversely to and located in the path of movement of the workbody for severing a section from the workbody as the latter is moved therepast by said carrier assembly, means operatively connected with said carrier assembly for rotating the same, said carrier assembly including upright receptacle means with a longitudinal workbody passageway for slidably receiving the workbody, said receptacle means having a discharge end disposed above said cutting edge of said knife means and through which the workbody passes, and a curved deflector beneath said carrier assembly and knife means located in an upright position, curved transversely to the path of movement of the workbody to confront severed sections of the workbody and deflect them downward and rearward of the workbody path, and means securing said deflector to said support means for relative adjustment toward and away from said knife means in directions along the path of workbody travel, said deflector serving to abruptly deflect and thereby break severed sections of the workbody when positioned closely adjacent the knife means.

PO-1050
(5/69)

UNITED STATES PATENT OFFICE
CERTIFICATE OF CORRECTION

Patent No. 3,587,689            Dated June 28, 1971

Inventor(s) LOUIS A. BETTCHER

It is certified that error appears in the above-identified patent and that said Letters Patent are hereby corrected as shown below:

Claim 2, Column 14, line 68, change "form" to --form--.

Claim 4, Column 15, line 27, change "inclines" to --inclined--

Signed and sealed this 9th day of November 1971.

(SEAL)
Attest:

EDWARD M. FLETCHER, JR.
Attesting Officer

ROBERT GOTTSCHALK
Acting Commissioner of Patents